Figure 1:
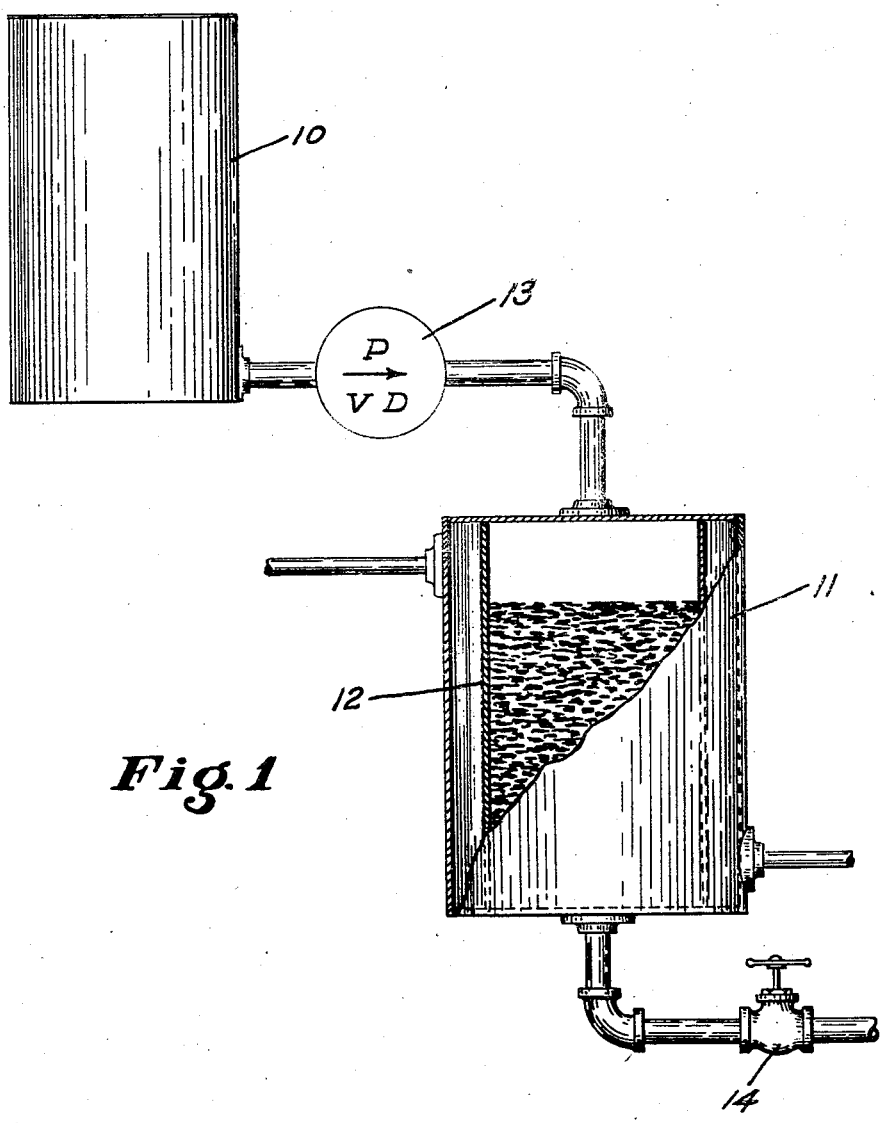

Dec. 10, 1946.  G. GOLDFINGER  2,412,504
TREATING STYRENE AND OTHER MONOMERS
USED IN POLYMERIZATION PROCESSES
Filed June 29, 1944

INVENTOR.
George Goldfinger.
BY
Attorney

Patented Dec. 10, 1946

2,412,504

UNITED STATES PATENT OFFICE 2,412,504

TREATING STYRENE AND OTHER MONOMERS USED IN POLYMERIZATION PROCESSES

George Goldfinger, Brookline, Mass., assignor to Godfrey L. Cabot, Inc., Boston, Mass., a corporation of Massachusetts Application June 29, 1944, Serial No. 542,728

1 Claim. (Cl. 260—669)

This invention consists in a novel process of freeing styrene, butadiene or other monomeric vinyl products employed in polymerization processes from inhibitors and for improving the polymerized product.

In order to prevent spontaneous or premature polymerization of styrene and like materials under commercial conditions of storage and transportation, it is the custom to add an agent, such as hydroquinone, which by its presence inhibits or substantially retards polymerization of the monomeric material. In some commercial applications, as for example in preparing styrene molding powders, the presence of small amounts of inhibitor may be of little consequence. In the manufacture of synthetic rubber or polymers where the process or product must be more strictly controlled, however, it is essential to free the monomer from the inhibitor which has been added. Two commercial processes of purifying styrene and other monomers used for polymerization processes have been used heretofore, sometimes singly and sometimes in combination. One of these known processes consists in washing the monomer with sodium hydroxide solution, and the other is by fractional distillation. Neither method is entirely satisfactory, the first because it is a batch process and the second because in the distillation low temperatures and low pressures must be used for fractionation with the requirement of expensive equipment. An object of the present invention is to provide a process which may be carried out in a continuous manner with inexpensive apparatus automatically controlled in its effect.

The influence of an inhibitor in a polymerization goes further than merely extending the induction period. The removal of inhibitors is of great importance, not only from a standpoint of expediting polymerization but also for improving the quality of the polymer. It is well known that the polymer initially formed in the presence of inhibitor has an injurious effect on the quality of the finished product. Accordingly, it is very desirable to treat the monomer so that a small portion of the monomer is polymerized, and this first polymer, along with the inhibitor, is removed. Thus the quality of the finished product is materially improved.

I have discovered that these important and valuable objects may be achieved, that inhibitor may be removed conveniently and completely, and that the first polymers formed in the system may also be removed, by treating inhibited styrene and the like with commercial carbons, notably carbon black. The following illustrative set of examples will make clearer the effect of the treatment above outlined when carried out on commercial styrene, containing hydroquinone as an inhibitor, and employing carbon black sold under the trade name "Carbolac 1."

From each of six samples of monomeric styrene 20 cc. were poured into a test tube and heated to 100° C. At this temperature polymerization should set in immediately if no inhibitor is present. The time of the beginning of polymerization was indicated by pouring a few drops of styrene from each of the test tubes at regular intervals into an excess of acetone. Since acetone is a solvent only for monomeric styrene but not for the polymer, traces of polymeric styrene immediately manifest themselves through cloudiness of the acetone-styrene mixture. Therefore, this is a satisfactory test for finding the time of the beginning of polymerization through observation of the time the monomeric styrene must be kept at 100° C. before drop from the heated styrene induce cloudiness in the acetone solution. The following table gives the results of those measurements. They show that no polymerization occurred in the inhibited styrene after heating for 60 minutes; that polymerization began to take place in styrene purified by distillation when heated for 20 minutes; that styrene purified by the process of my invention began to polymerize after 25 minutes in two cases, after 40 minutes in one case, and after 50 minutes in the last instance.

*Styrene polymerization tests—100° C.*

1. Commercial styrene with inhibitor.
2. Commercial styrene distilled.
3. Commercial styrene with inhibitor shaken with Carbolac 1, heated to 100° C. for 15 minutes and filtered.
4. Commercial styrene with inhibitor shaken with Carbolac 1, heated to 100° C. for 30 minutes and filtered.
5. Commercial styrene with inhibitor shaken with Carbolac 1, heated to 100° C. for 45 minutes and filtered.

6. Commercial styrene with inhibitor shaken with Carbolac 1, heated to 100° C. for 60 minutes and filtered.

| | Minutes | | | | | |
|---|---|---|---|---|---|---|
| | 20 | 25 | 30 | 40 | 50 | 60 |
| 1 | Clear | Clear | Clear | Clear | Clear | Clear. |
| 2 | Cloudy | Cloudy | Cloudy | Cloudy | Cloudy | Cloudy. |
| 3 | Clear | V. slightly cloudy | V. slightly cloudy | Slightly cloudy | Slightly cloudy | Slightly cloudy. |
| 4 | do | do | do | do | Cloudy | Cloudy. |
| 5 | do | Clear | Clear | do | do | Do. |
| 6 | do | do | do | Clear | V. slightly cloudy | Slightly cloudy. |

The same experiments repeated using a commercial adsorptive carbon known as "Darco G-60" and a commercial decolorizing carbon known as "Norite A" also indicate substantial and satisfactory removal of the inhibitor and satisfactory reduction of the induction period. The results of these tests indicate that the adsorption of the inhibitor by the carbon or the carbon black is quite rapid. The inhibitors such, for example, as hydroquinone, present in the above examples were those commonly used in monomeric vinyl products.

My invention includes within its scope a simple commercial process for purifying styrene and other monomers which are liquid at room temperature. In this application of my invention the process may be carried out continuously and require only apparatus of compact arrangement and moderate volume. The apparatus is illustrated in the accompanying drawing in which the figure is a diagrammatic view in elevation of the apparatus. The process involves a hot filtration of the monomeric material under pressure through a bed of activated carbon or carbon black.

The apparatus required comprises merely a reservoir 10 for the inhibited monomer, a steam jacketed column 11 packed with carbon black 12, a pump 13, and pipe connections between the reservoir and the pump. The carbon black packing and the liquid monomer above it are heated to a temperature approximating the boiling point at atmospheric pressure of the particular monomer being treated. The rate of filtration is adjusted in such a manner that the monomer spends a sufficient period of time in the hot zone of the column to overcome its entire induction period and to polymerize to about 0.25% or 0.5%. Thus the carbon black is effective not only to adsorb the inhibitor but also to adsorb the first polymerized material. The purified and improved monomer may be drawn from the bottom of the column through suitable valve connections 14.

Having thus disclosed my invention, I claim as new and desire to secure by Letters Patent:

The process of improving for polymerization monomeric vinyl products such as styrene and butadiene, which includes the steps of heating the monomer containing an inhibitor such as hydroquinone to approximately the boiling point while in contact with carbon black thereby (1) causing initial polymerization of a small amount of the monomer, (2) adsorbing the inhibitor from the monomer, and (3) also adsorbing the initially formed polymer.

GEORGE GOLDFINGER.